(12) United States Patent
Bettink et al.

(10) Patent No.: US 9,054,974 B2
(45) Date of Patent: Jun. 9, 2015

(54) RELIABLY TRANSPORTING PACKET STREAMS USING PACKET REPLICATION

(75) Inventors: John H. W. Bettink, San Jose, CA (US); Anbu Chezhian Gunalan, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 16 days.

(21) Appl. No.: 13/562,137

(22) Filed: Jul. 30, 2012

(65) Prior Publication Data

US 2014/0029622 A1  Jan. 30, 2014

(51) Int. Cl.
*H04L 12/801* (2013.01)

(52) U.S. Cl.
CPC ..................... *H04L 47/10* (2013.01)

(58) Field of Classification Search
CPC ........ H04L 1/007; H04L 45/24; H04W 24/06
See application file for complete search history.

(56) References Cited

U.S. PATENT DOCUMENTS

| | | | |
|---|---|---|---|
| 5,404,352 A | 4/1995 | Pauwels et al. | |
| 6,144,640 A * | 11/2000 | Simpson et al. | 370/236 |
| 6,493,315 B1 * | 12/2002 | Simpson et al. | 370/229 |
| 7,031,304 B1 * | 4/2006 | Arberg et al. | 370/360 |
| 7,133,415 B2 * | 11/2006 | Zelig et al. | 370/466 |
| 7,197,008 B1 * | 3/2007 | Shabtay et al. | 370/218 |
| 7,310,306 B1 | 12/2007 | Cheriton | |
| 7,715,309 B2 * | 5/2010 | Scholl et al. | 370/218 |
| 7,720,055 B2 * | 5/2010 | Kadambi et al. | 370/389 |
| 7,773,578 B2 * | 8/2010 | Liu | 370/351 |
| 7,890,991 B2 * | 2/2011 | Kay | 726/1 |
| 7,940,777 B2 * | 5/2011 | Asati et al. | 370/395.52 |
| 7,961,755 B2 * | 6/2011 | Harel et al. | 370/466 |
| 7,969,970 B2 * | 6/2011 | Burchard et al. | 370/386 |
| 8,064,336 B2 * | 11/2011 | Scholl et al. | 370/218 |
| 8,873,567 B1 * | 10/2014 | Mandal et al. | 370/400 |
| 2002/0021661 A1 | 2/2002 | DeGrandepre et al. | |
| 2002/0080786 A1 * | 6/2002 | Roberts | 370/389 |
| 2003/0041208 A1 * | 2/2003 | Volkmar | 710/316 |
| 2005/0201273 A1 * | 9/2005 | Shimizu | 370/216 |
| 2006/0013210 A1 | 1/2006 | Bordogna et al. | |
| 2006/0140226 A1 | 6/2006 | Ho et al. | |
| 2006/0268686 A1 * | 11/2006 | Shei et al. | 370/217 |
| 2007/0002770 A1 * | 1/2007 | Haalen et al. | 370/256 |
| 2009/0129262 A1 * | 5/2009 | Honma | 370/225 |
| 2009/0135890 A1 * | 5/2009 | Chan et al. | 375/219 |
| 2009/0154342 A1 * | 6/2009 | Oltman et al. | 370/220 |
| 2009/0154461 A1 * | 6/2009 | Kitani et al. | 370/392 |

(Continued)

*Primary Examiner* — Andrew Lai
*Assistant Examiner* — Hoyet H Andrews
(74) *Attorney, Agent, or Firm* — The Law Office of Kirk D. Williams (57) ABSTRACT

In one embodiment, packet streams are reliably transported through a network using packet replication. A packet stream is received at a duplication point in a network, with two or more copies of each of the packet streams being transported, typically over divergent paths in the network, to a merge point from which a single copy of the packet stream is forwarded or consumed. In one embodiment, this merge point is a packet switching device that includes ingress card(s) and egress line card(s), wherein multiple copies of the packet stream are received by ingress line card(s), with only a single copy provided to an egress line card of the packet switching device. In this manner, a switching fabric or other communication mechanism communicatively coupling the ingress line card(s) to the egress line card, nor the egress line card, is taxed with the burden imposed by additional copies of packet stream.

18 Claims, 8 Drawing Sheets

(56) References Cited

U.S. PATENT DOCUMENTS

| | | | |
|---|---|---|---|
| 2009/0238184 A1* | 9/2009 | Darnell et al. | 370/392 |
| 2010/0008359 A1* | 1/2010 | Kay | 370/389 |
| 2010/0014428 A1* | 1/2010 | Naven et al. | 370/237 |
| 2010/0085873 A1 | 4/2010 | Moons | |
| 2010/0172361 A1 | 7/2010 | Scholl et al. | |
| 2010/0189116 A1 | 7/2010 | Brolin | |
| 2010/0232428 A1* | 9/2010 | Shinohara | 370/389 |
| 2010/0235593 A1* | 9/2010 | Yadav et al. | 711/161 |
| 2010/0284401 A1* | 11/2010 | Beshai | 370/389 |
| 2010/0303083 A1* | 12/2010 | Belanger et al. | 370/401 |
| 2010/0312943 A1* | 12/2010 | Uehara et al. | 710/316 |
| 2010/0316053 A1* | 12/2010 | Miyoshi et al. | 370/392 |
| 2011/0085545 A1* | 4/2011 | Tadimeti et al. | 370/389 |
| 2011/0197011 A1* | 8/2011 | Suzuki et al. | 710/316 |
| 2011/0211443 A1* | 9/2011 | Leong et al. | 370/218 |
| 2011/0222534 A1* | 9/2011 | Kurita | 370/389 |
| 2011/0228778 A1* | 9/2011 | Dyke et al. | 370/392 |
| 2013/0114593 A1 | 5/2013 | Jabr et al. | |
| 2013/0201826 A1 | 8/2013 | Testa et al. | |
| 2014/0064292 A1 | 3/2014 | Binetti et al. | |

* cited by examiner

INGRESS LINE CARD PROCESSING
FIGURE 7

EGRESS LINE CARD PROCESSING
FIGURE 8

RELIABLY TRANSPORTING PACKET STREAMS USING PACKET REPLICATION

TECHNICAL FIELD

The present disclosure relates generally to communicating information over a network between two networked devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably communicating information in a network is important. Different techniques are employed, including those included in a protocol used to communicate packets, as well as path protection for being able to quickly reroute traffic when a particular path no longer becomes available.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with reliably transporting packet streams using packet replication. One embodiment receives one or more packet streams at a duplication point in a network, and transmits two or more copies of each of these packet stream(s), typically over divergent paths in the network, to a merge point from which a single copy of each packet stream is forwarded or consumed.

In one embodiment, this merge point is a packet switching device that includes ingress card(s) and egress line card(s), wherein multiple copies of the packet stream are received by ingress line card(s), with only a single copy provided to an egress line card of the packet switching device. In this manner, a switching fabric or other communication mechanism communicatively coupling the ingress line card(s) to the egress line card, nor the egress line card, is taxed with the burden imposed by additional copies of packet stream(s).

In one embodiment, a distributed mechanism is used to coordinate the switching between which streams of packets are forwarded to the egress line card by including in each packet stream a protection marker identifying a same position in the stream of packets, and identifying to switch a packet stream from being in an active state to a protect state (to now drop packets), or from being in a protect state to an active state (to now forward packets to the egress line card).

In one embodiment, in response to a failure, such as a loss in receiving an active packet stream or loss of an ingress line card on which the active packet stream is received while a corresponding protect stream is still being received, the packet switching device changes the protect stream to an active stream so that the packet switching device is able to quickly resume sending packets of the packet stream.

2. Description

Disclosed are, inter alia, methods, apparatus, computer-storage media, mechanisms, and means associated with reliably transporting packet streams using packet replication. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Figure 1:
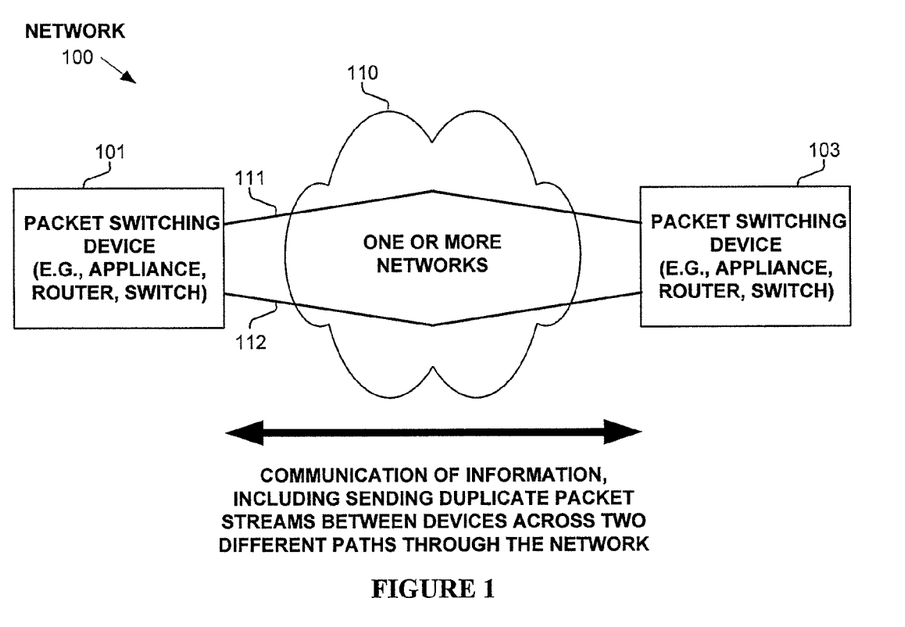
FIG. 1 is a block diagram of a network operating according to one embodiment.

Expressly turning to the figures, an unlimited number of network configurations could operate according to one embodiment. FIG. 1 illustrates a particular network 100 operating according to one embodiment. In one embodiment, network 100 includes packet switching device (e.g., appliance, router, switch) 101 and packet switching device 103, which are communicatively coupled via one or more networks 110 at least over divergent paths 111 and 112. In one embodiment, each of paths 111 and 112 is a Multiprotocol Label Switching (MPLS) tunnel, such as, but not limited to, an MPLS Transport Profile (MPLS-TP) tunnel.

In one embodiment, packet switching device 101 receives one or more original packet streams, and transmits a copy of each of these original packet stream(s) over each of paths 111 and 112 to packet switching device 103. Packet switching device 103 sends from itself a single copy of each original packet stream packet, in-order, and without missing any packets, while dropping one received copy of the original packet stream. In one embodiment, one of these two packet streams received by packet switching device 103 is designated as being in the active state, while the other is in a protect state. In case of a switchover, the two packet streams switch roles of being in the active/protect states, typically while sending a single copy of each original packet stream packet, in-order, and without missing or duplicated any packets. In one embodiment, packet switching device 103 receives multiple copies of one or more original streams of packets, and sends from itself a single copy of each original packet stream packet, in-order, and without missing any packets, while dropping one received copy of the original packet stream.

Figure 2A:
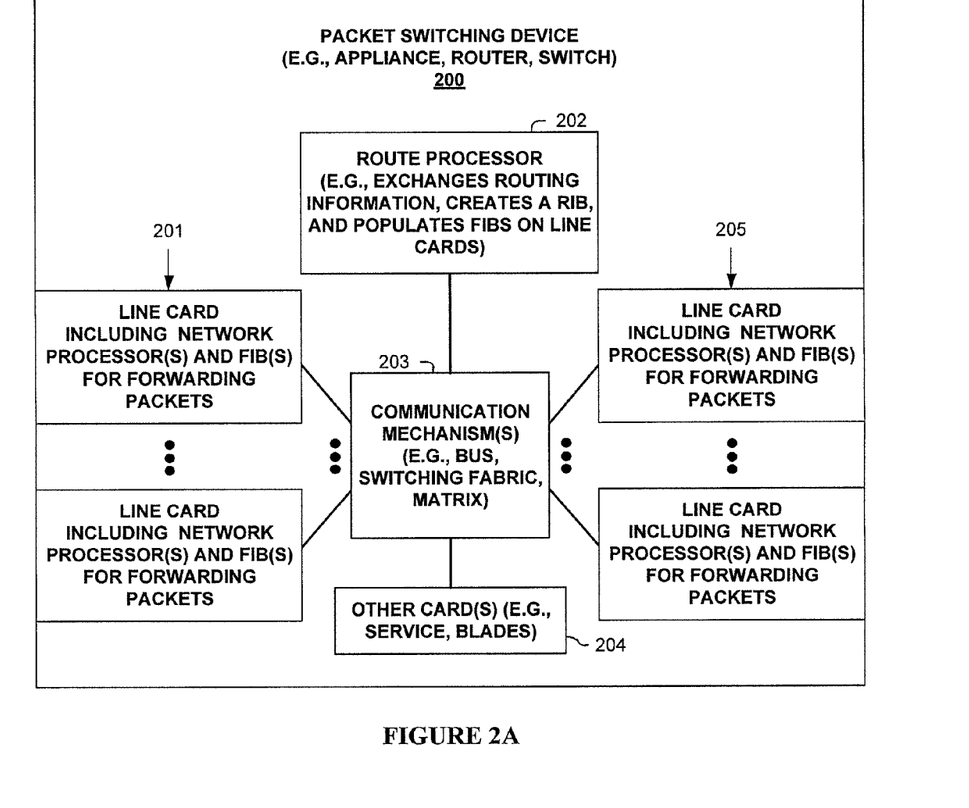
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with reliably transporting packet streams using packet replication. Packet switching device 200 also has a control plane with one or more processing elements 202 for managing the control plane and/or control plane processing of packets associated with reliably transporting packet streams using packet replication. Packet switching device 200 also includes other cards 204 (e.g., service cards, blades) which include processing elements that are used in one embodiment to process packets associated with reliably transporting packet streams using packet replication, and some communication mechanism 203 (e.g., bus, switching fabric, matrix) for allowing its different entities 201, 202, 204 and 205 to communicate.

In one embodiment, each of two line cards 201 (or a same line card) receives copies of packets of an original packet stream (which causes each of these line cards to be considered an "ingress" line card as they are receiving packets), and a line card 205 sends from packet switching device 200 a single copy of the original packet stream (which deems that line card an "egress" line card). As can be observed in FIG. 2A, if only a single one of the two ingress line cards 201 (or a single line card) forward packets of only one copy of the original stream (across communication mechanism 203) to egress line card 205 while the other (or same) ingress line card 201 drops its received packets of one copy of the original packet stream, resources of communication mechanism 203 nor egress line card 205 are consumed with communicating/processing these duplicate packets. Note, line cards 201 and 205 typically perform the actions of being both an ingress and egress line card, in regards to multiple other particular packets and/or packet streams being received by, or sent from, packet switching device 200.

Figure 2B:
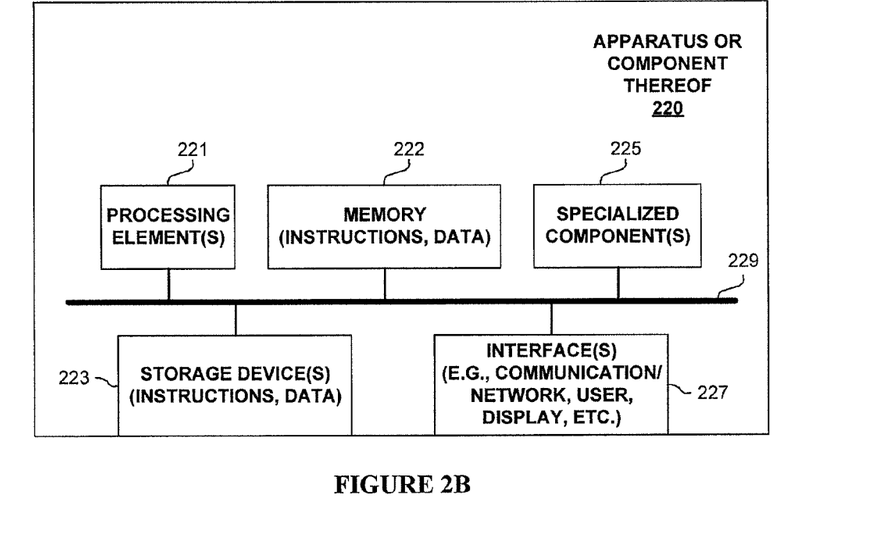
FIG. 2B illustrates an apparatus according to one embodiment.

FIG. 2B is a block diagram of an apparatus 220 used in one embodiment associated with reliably transporting packet streams using packet replication. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3:
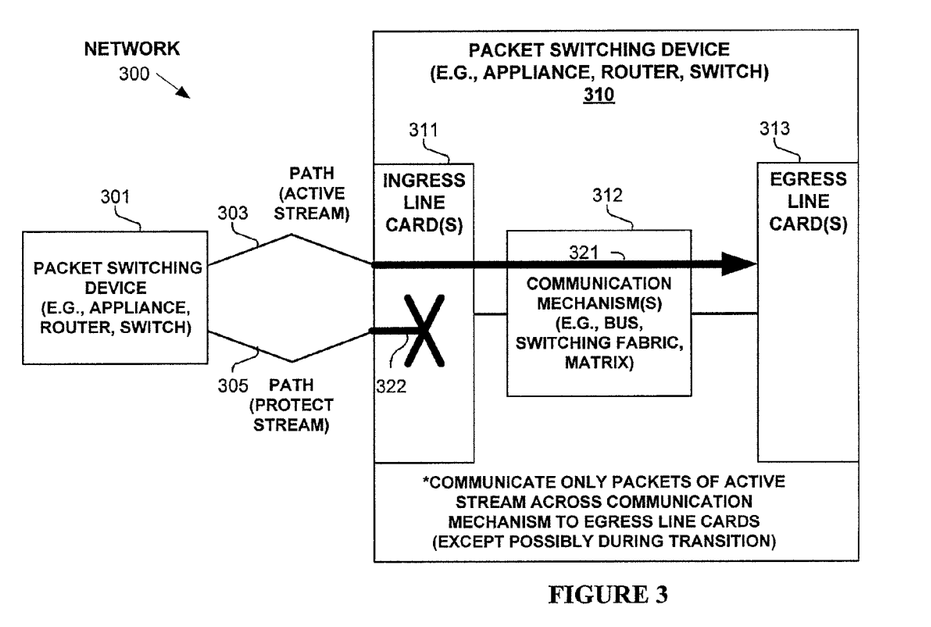
FIG. 3 is a block diagram of a network operating according to one embodiment.

FIG. 3 illustrates a network 300 operating according to one embodiment. Packet switching device 301 sends packets of an original packet stream over two paths 303, 305 to packet switching device 310, which are received on one or more line cards 311 (e.g., each on a same or different line card). Line card 311 sends (321) packets of the received active stream (e.g., the stream of packets in the active state) across communication mechanism 312 to an egress line 313 (which forwards or otherwise processes the active packet stream). Line card 311 drops (322) packets of the protect stream (e.g., the stream of packets in the protect state). The states of the received packet streams can be switched, and when done so in a normal manner in one embodiment, no packets are lost, nor are duplicate packets provided to egress line card 313.

In one embodiment, in response to a detected failure (e.g., based on a timeout or other mechanism) in egress line card 313 receiving packets in the active stream, ingress line card 311 will commence forwarding packets of the protect stream (that it was previously dropping) to egress line card 313, so egress line card 313 can resume sending out or otherwise processing packets of the original packet stream, while reducing the delay in its resumption and the number of missing packets in the sent out version of the original packet stream.

Figure 4:
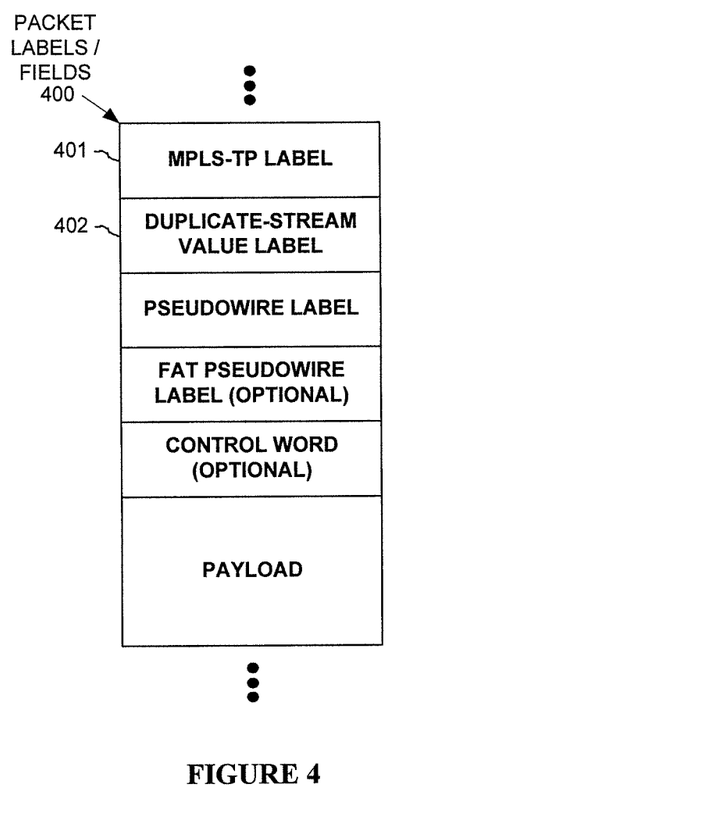
FIG. 4 illustrates fields of a replicated packet according to one embodiment.

FIG. 4 illustrates selected fields 400 of a packet used in one embodiment associated with reliably transporting packet streams using packet replication. One embodiment forwards each replicated stream of packets in a different MPLS-TP tunnel (identified by MPLS-TP Label 402 in the label stack of the packet), and each individual replicated stream within an MPLS-TP tunnel identified by a different duplicate-stream value (identified by duplicate-stream value label 402 in the label stack of the packet). The duplicate-stream value typically uniquely identifies a stream of packets which has been replicated at a particular point, as multiple replicated streams of packets can typically be transported across a same path (e.g., in a same tunnel). Thus, one embodiment maintains an original ordering of packets within a same packet stream identified by a duplicate-stream value received on a particular path (e.g., in a tunnel), while not attempting to maintain an ordering of all packets received on the particular path. In contrast, one embodiment maintains an original ordering of packets within a same packet stream corresponding to an entire tunnel (or other conduit), and therefore, does not use (or does not need to use the identification by) a duplicate-stream value as the identification of the tunnel (or other conduit) suffices to provide the information. Further note, a stream of packets can be any set of packets (e.g., all packets received on an interface, packets uniquely identified by a set of fields of the headers of the packets) for which the same order of its packets is desired; and is not limited to only be a stream of packets uniquely identified by a set of fields (e.g., source address, destination address, source port, destination port, protocol type) of the headers of the packets. Additionally, any tunneling protocol could be used in one embodiment, with MPLS-TP being one example of a tunneling protocol used in one embodiment.

Figure 5:
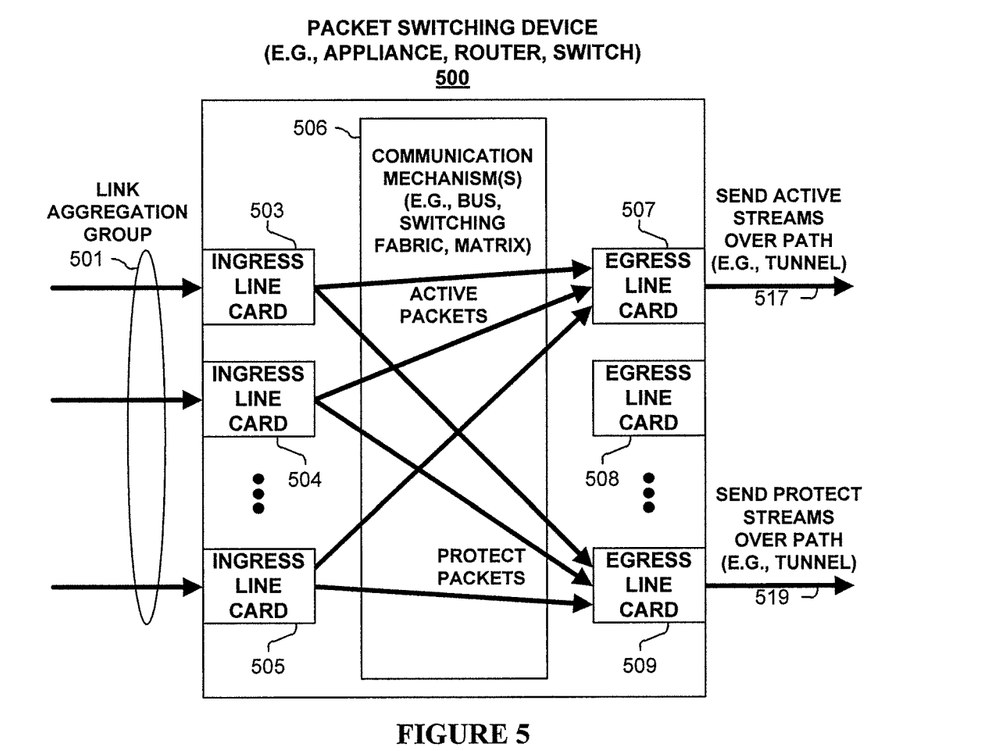
FIG. 5 illustrates a packet switching device operating according to one embodiment.

FIG. 5 illustrates the processing by packet switching device 500 of multiple streams of packets received on a link aggregation group (LAG) 501. A LAG is often used to communicate packets across multiple physical links, while often appearing to the end devices as a single logical link. A LAG often load balances packets across its multiple links, which also allows redundancy as if a single link goes down, as the packets are communicated across the remaining links of the LAG.

Illustrated in FIG. 5 is one embodiment of a duplication-point packet switching device 500, which is configured to received packets on LAG 501, and to send out replicated streams of packets over two different paths 517 and 519 from egress line cards 507 and 509, respectively. As shown, link aggregation group is terminated on multiple (ingress) line cards (503-505), with at least a subset of the packets received on each of ingress line cards (503-505) considered an individual packet stream (and identified by a different duplicate-stream value inserted by its receiving ingress line card 503-505) for purposes of reliably transporting packet streams using packet replication.

In one embodiment, a same duplicate-stream value is included in each packet of a same replicated stream (whether in the active or protect state), which simplifies correlation at a merge point in the network as no signaling is required to associate a stream in an active state with its corresponding stream in a protect state (when it is known that particular active and protect tunnels are associated with each other). In one embodiment, each duplicate-stream value uniquely identifies a duplication point in a network for a stream of packets. Therefore, the range of values required for a duplicate-stream value can be readily known by the configuration of packet switching device 500. In one embodiment, each ingress line card deterministically determines the duplicate-stream value based on hashing, or otherwise computing, the duplicate-stream value based on an identification of the duplication point (e.g., by processor one on line card two), thus, requiring no centralized distribution of duplicate-stream values.

In one embodiment, an active and/or protect packet stream may be transported across a LAG, with different packets of the active and/or protect stream transported across a different portion of a path. One embodiment assigns duplicate-stream values, which may be modified (e.g., concatenated with a LAG or other sub-path value), such that a merge point in the network receives packets whose path taken is uniquely identified by the duplicate-stream value received by the merge point (e.g., packet switching device). In one embodiment, each duplicated packet in an active state and its counterpart(s) in a protect state have the same duplicate-stream value.

As part of reliably transporting packet streams using packet replication, it may be necessary, or otherwise desirous, to switch an active stream to being a protect steam, and a protect stream to an active steam. As previously discussed, in case of a detected failure, packets of one or more protected streams are no longer dropped by an ingress line card of a merge point (e.g., packet switching device), and therefore, the egress line card may be able to quickly resume forwarding (or otherwise processing) packets of the original stream of packets (depending on the amount of failure in the network and/or packet switching device).

Figure 6:
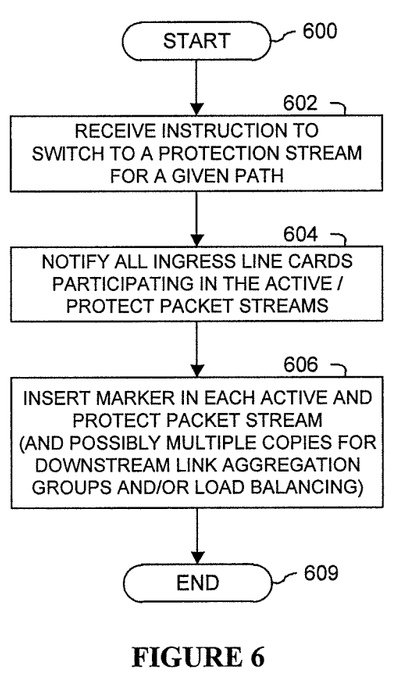
FIG. 6 illustrates a process according to one embodiment.
Figure 7:
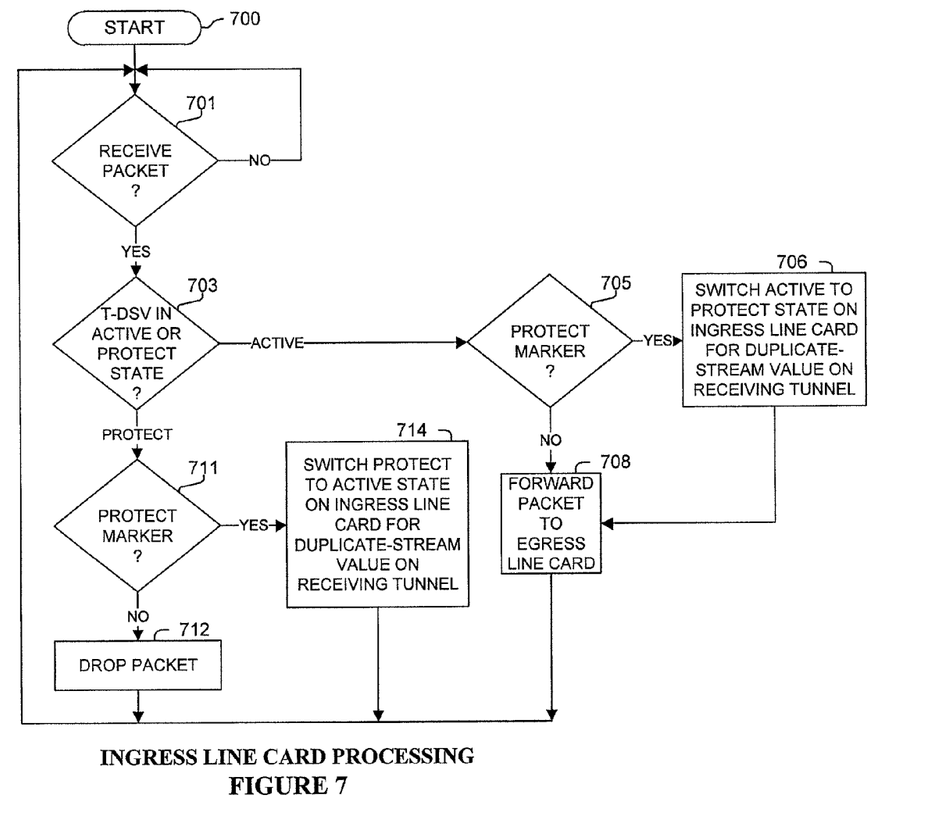
FIG. 7 illustrates a process according to one embodiment.
Figure 8:
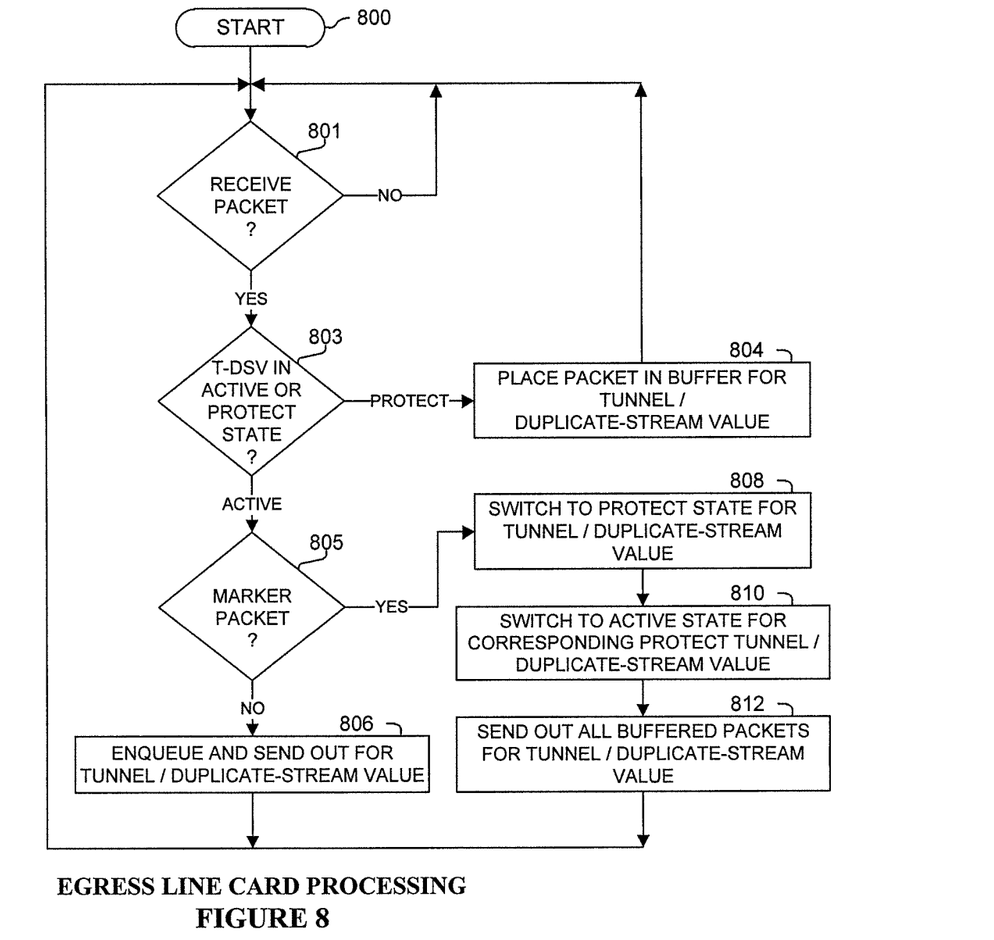
FIG. 8 illustrates a process according to one embodiment.

A more graceful transition of streams of packets from an active mode to a protect mode while simultaneously transitioning a corresponding stream of packets from a protect mode to the active mode is illustrated by the processes of FIGS. 6-8.

FIG. 6 illustrates a process used in one embodiment by a duplication-point packet switching device. Processing begins with process block 600. In process block 602, an instruction is received to switch to use a protection stream for each active stream associated with a particular path. For example, in one embodiment, a packet switching device receives an instruction (e.g., from a remote device or operator console), to switch from using all active streams of a particular path (e.g., a specified MPLS-TP tunnel or other tunnel) to use corresponding protection streams of another path (e.g., of another MPLS-TP or other tunnel). In process block 604, the duplication-node packet switching device notifies all ingress line cards participating in the corresponding active/protect streams of this switching. In process block 606, each duplication point (e.g., an ingress line card in this embodiment) inserts a protect marker in each affected active and protect stream of packets. In one embodiment, more than one copy of a protect marker is sent to ensure that one marker will go over each unique path through the network (e.g., in a network using a LAG before reaching the merge-point packet switching device). Using protect markers in each of the streams provides a synchronous protect marking in each active and protect stream of each original packet stream that is the same position in the original stream of packets, which provides an easy way for a merge-point router to switch between an active and its corresponding protect stream of packets without duplicating or dropping packets. Processing of the flow diagram of FIG. 6 is complete as indicated by process block 609.

FIG. 7 illustrates a process performed by an ingress line card of a merge-point packet switching device of one embodiment. Processing begins with process block 700. As determined in process block 701, when a packet of an active or protect stream is received, then a determination is made in process block 703. If the packet is from the active packet stream as determined based on its duplicate-stream value with the tunnel in which it was received (tunnel-duplicate-stream value abbreviated as T-DSV), then if it includes a protect marker as determined in process block 705, then in process block 706, the active stream of the duplicate-stream value of the tunnel on which it was received is placed in a protect mode. Next, in process block 708 (either proceeding from process block 705 or 706), the received packet is forwarded to the egress line card. Processing returns to process block 701.

Otherwise, in process block 703, the received packet was from a packet stream in the protect state. If the received packet does not include a protect marker as determined in process block 711, then in process block 712, the packet is dropped at the ingress line card. Otherwise, in process block 714, the protect stream of the duplicate-stream value of the tunnel on which it was received is placed in an active mode, and processing returns to process block 701.

FIG. 8 illustrates a process performed by an egress line card of a merge point packet switching device of one embodiment. Processing begins with process block 800. As determined in process block 801, when a packet of an active or protect stream is received, then a determination is made in process block 803. Note, during a switch-over, an egress line card may consider a packet stream to be in the active or protect mode, while the ingress line card considers it to be in a different mode.

As determined in process block 803, if the packet is from a protect packet stream as determined based on the tunnel in which it was received and its duplicate-stream value (tunnel-duplicate-stream value abbreviated as T-DSV), then, in process block 804, the packet is buffered for the tunnel/duplicate-stream value as a marker packet has not been received in the active stream yet; thus, the sending or otherwise processing of this packet must be delayed to maintain the order of the original packet stream.

Otherwise, as determined in process block 803, the packet is part of the active stream and then as determined in process block 805, if the received packet of the active stream is not a marker packet, then in process block 806, the packet is either immediately sent out or placed at the end of a buffer of packets for the duplicate-stream value/tunnel on which the packet was received at least if there are any corresponding residual packets from a switchover.

Otherwise, the received packet in the active stream is a marker packet, and processing proceeds to process block 808, wherein the state of the duplicate-stream value/tunnel on which the packet was received is changed from active state to a protect state. In process block 810, a corresponding protect state packet stream is switched from a protect state to an active state. In process block 812, all buffered packets (i.e., buffered in process block 804) from the old protect state packet stream just switched to the active state in process block 810, are sent out. Processing returns to process block 801.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    duplicating, by a first packet switching device, an original packet stream into a first packet stream and a second packet stream;
    sending packets of the first packet stream over a first path, divergent from a second path, from the first packet switching device to a second packet switching device, while sending packets of the second packet stream over the second path from the first packet switching device to the second packet switching device; and
    communicating, from an ingress line card of the second packet switching device to a particular egress line card of the second packet switching device, packets of the first packet stream, while dropping, by an ingress line card of the second packet switching device, packets of the second packet stream;
    wherein the first path corresponds to a first Multiprotocol Label Switching (MPLS) tunnel with each particular packet of the first packet stream including a same first MPLS label, corresponding to the first MPLS tunnel, in the label stack of the particular packet of the first packet stream; and wherein the second path corresponds to a second MPLS tunnel, different than the first MPLS tunnel, with each particular packet of the second packet stream including a same second MPLS label, corresponding to the second MPLS tunnel, in the label stack of the particular packet of the second packet stream.

2. The method of claim 1, comprising: sending, from the second packet switching device, a single copy of packets, in-order, and without missing or duplicated packets, of the original packet stream.

3. The method of claim 1, comprising: switching to drop packets of the first packet stream at an ingress line card of the second packet switching device, and switching to communicate packets of the second packet stream from an ingress line card of the second packet switching device to the egress line card, while continuing to perform said sending, from the second packet switching device, a single copy of packets, in-order, and without missing or duplicated packets, of the original packet stream.

4. The method of claim 3, wherein performing said switching is performed in response to a synchronous protect marker being received in the first packet stream and the synchronous protect marker being received in the second packet stream, wherein the synchronous protect marker marks a same position in the original stream of packets in each of the first and second packet streams.

5. The method of claim 4, wherein said switching to drop packets of the first packet stream at an ingress line card of the second packet switching device is performed in response to receiving the synchronous protect marker in the first packet stream; and wherein said switching to communicate packets of the second packet stream from an ingress line card of the second packet switching device to the egress line card is performed in response to receiving the synchronous protect marker in the second packet stream.

6. The method of claim 4, wherein the synchronous protect marker received in each of the first and second packet streams is sent from the first packet switching device to the second packet switching device.

7. The method of claim 1, wherein each specific first packet of the first packet stream includes a duplicate-stream value label in the label stack of the specific first packet, with the duplicate-stream value label identifying the first packet stream within the first MPLS tunnel; wherein each specific second packet of the second packet stream includes the duplicate-stream value label in the label stack of the specific second packet, with the duplicate-stream value label identifying the second packet stream within the first MPLS tunnel.

8. A method, comprising:
receiving, by a first packet switching device, an original packet stream on a first link of a bundled plurality of links and a second original packet stream on a second link of the bundled plurality of links;
duplicating, by the first packet switching device, the original packet stream into a first packet stream and a second packet stream;
sending packets of the first packet stream over a first path, divergent from a second path, from the first packet switching device to a second packet switching device, while sending packets of the second packet stream over the second path from the first packet switching device to the second packet switching device; and
communicating, from an ingress line card of the second packet switching device to a particular egress line card of the second packet switching device, packets of the first packet stream, while dropping, by an ingress line card of the second packet switching device, packets of the second packet stream;
duplicating, by the first packet switching device, the second original packet stream into a third packet stream and a fourth packet stream;
sending packets of the third packet stream over the first path, from the first packet switching device to a second packet switching device, while sending packets of the fourth packet stream over the second path from the first packet switching device to the second packet switching device; and
communicating, from an ingress line card of the second packet switching device to the particular egress line card of the second packet switching device, packets of the third packet stream, while dropping, by an ingress line card of the second packet switching device, packets of the fourth packet stream.

9. The method of claim 8, wherein the first path corresponds to a first Multiprotocol Label Switching (MPLS) tunnel with each particular packet of the first and third packet streams including a same first MPLS label, corresponding to the first MPLS tunnel, in the label stack of the particular packet; and wherein the second path corresponds to a second MPLS tunnel, different than the first MPLS tunnel, with each specific packet of the second packet stream including a same second MPLS label, corresponding to the second MPLS tunnel, in the label stack of the specific packet; and
wherein each specific first packet of the first packet stream includes a first duplicate-stream value label in the label stack of the specific first packet, with the first duplicate-stream value label identifying the first packet stream within the first MPLS tunnel; wherein each specific second packet of the second packet stream includes the first duplicate-stream value label in the label stack of the specific second packet, with the first duplicate-stream value label identifying the second packet stream within the second MPLS tunnel; wherein each specific third packet of the third packet stream includes a second duplicate-stream value label, different than the first duplicate-stream value label, in the label stack of the specific third packet, with the second duplicate-stream value label identifying the third packet stream within the first MPLS tunnel; and wherein each specific fourth packet of the fourth packet stream includes the second duplicate-stream value label in the label stack of the specific third packet, with the second duplicate-stream value label identifying the fourth packet stream within the second MPLS tunnel.

10. The method of claim 9, comprising: switching to drop packets of the first and third packet streams at an ingress line card of the second packet switching device, and to communicate packets of the second and fourth packet streams from an ingress line card of the second packet switching device to the egress line card, while continuing to perform said sending, from the second packet switching device, a single copy of packets, in-order, and without missing or duplicated packets, of the first and second original packet streams.

11. A method, comprising:
receiving, on one or more ingress line cards of a packet switching device, a first packet stream and a second packet stream over different paths through a network, wherein each of the first packet stream and the second packet stream includes a replicated stream of packets; and
communicating packets of the first packet stream from an ingress line card of said one or more ingress line cards to an egress line card of the packet switching device and then from the packet switching device, while contemporaneously dropping packets of the second packet stream at an ingress line card of said one or more ingress line cards;
wherein each of said different paths through the network corresponds to a different Multiprotocol Label Switching (MPLS) tunnel, with each particular packet of the first packet stream including a same first MPLS label corresponding to a first MPLS tunnel of said different MPLS tunnels, in the label stack of the particular packet of the first packet stream, and with each particular packet of the second packet stream including a same second MPLS label corresponding to a second MPLS tunnel of said different MPLS tunnels, in the label stack of the particular packet of the second packet stream; and
wherein each specific first packet of the first packet stream includes a duplicate-stream value label in the label stack of the specific first packet, with the duplicate-stream value label identifying the first packet stream within the first MPLS tunnel; and wherein each specific second packet of the second packet stream includes the duplicate-stream value label in the label stack of the specific second packet, with the duplicate-stream value label identifying the second packet stream within the second MPLS tunnel.

12. The method of claim 11, wherein a single copy of packets, in-order, and without missing or duplicated packets, of the replicated stream of packets is sent from the packet switching device.

13. The method of claim 11, comprising: subsequent to said communicating packets and said dropping packets: in response to receiving a synchronous protect marker in the first packet stream switching to dropping packets of the first packet stream at an ingress line card of said one or more ingress line cards, and in response to receiving the synchronous protect marker in the second packet stream switching to communicating packets of the second packet stream from an ingress line card of said one or more ingress line cards to the egress line card and then from the packet switching device, wherein the synchronous protect marker marks a same position in the replicated stream of packets in each of the first and second packet streams.

14. A packet switching device, comprising:
- a first interface configured for communicating packets, including receiving a first packet stream;
- a second interface configured for communicating packets, including receiving a second packet stream, wherein each of the first and the second packet streams includes a same replicated stream of packets;
- an egress line card comprising: one or more interfaces configured for communicating packets, including sending packets from the packet switching device; and
- one or more communications mechanisms configured to communicatively couple at least a line card including the first interface with the egress line card, and a line card including the second interface with the egress line card;
- wherein the packet switching device is configured to: forward packets of the first packet stream to the egress line card over said one or more communications mechanisms when the first packet stream is in a first active state, and to drop packets of the first packet stream when the first packet stream is in a first protect state;
- wherein the packet switching device is configured to: forward packets of the second packet stream to the egress line card over said one or more communications mechanisms when the second packet stream is in a second active state, and to drop packets of the second packet stream when the first packet stream is in a second protect state; and
- wherein the first path corresponds to a first Multiprotocol Label Switching (MPLS) tunnel with each particular packet of the first packet stream including a same first MPLS label, corresponding to the first MPLS tunnel, in the label stack of the particular packet of the first packet stream; and wherein the second path corresponds to a second MPLS tunnel, different than the first MPLS tunnel, with each particular packet of the second packet stream including a same second MPLS label, corresponding to the second MPLS tunnel, in the label stack of the particular packet of the second packet stream.

15. The packet switching device of claim 14, wherein the first interface and the second interface are on different line cards of the packet switching device.

16. The packet switching device of claim 14, wherein each specific first packet of the first packet stream includes a duplicate-stream value label in the label stack of the specific first packet, with the duplicate-stream value label identifying the first packet stream within the first MPLS tunnel; wherein each specific second packet of the second packet stream includes the duplicate-stream value label in the label stack of the specific second packet, with the duplicate-stream value label identifying the second packet stream within the first MPLS tunnel.

17. The packet switching device of claim 14, wherein the packet switching device is configured to change the state of the first packet stream from the first active state to the first protect state in response to a first synchronous protect marker arriving in the first packet stream, and is configured to change the state of the first packet stream from the first protect state to the first active state in response to a second synchronous protect marker arriving in the first packet stream; and
- wherein the packet switching device is configured to change the state of the second packet stream from the second active state to the second protect state in response to the second synchronous protect marker arriving in the second packet stream, and is configured to change the state of the second packet stream from the second protect state to the second active state in response to the first synchronous protect marker arriving in the second packet stream;
- wherein a synchronous protect marker marks a same position in the same replicated stream of packets in each of the first and second packet streams.

18. The packet switching device of claim 17, wherein each specific first packet of the first packet stream includes a duplicate-stream value label in the label stack of the specific first packet, with the duplicate-stream value label identifying the first packet stream within the first MPLS tunnel; wherein each specific second packet of the second packet stream includes the duplicate-stream value label in the label stack of the specific second packet, with the duplicate-stream value label identifying the second packet stream within the first MPLS tunnel.

* * * * *